United States Patent
Oz et al.

(10) Patent No.: US 7,653,090 B2
(45) Date of Patent: Jan. 26, 2010

(54) METHOD, TRANSMITTER AND SYSTEM FOR PROVIDING VIDEO ON DEMAND SERVICES

(75) Inventors: Ran Oz, Modiin (IL); Oren Reches, Zoran (IL)

(73) Assignee: BigBand Networks, Inc., Redwood City, CA (US)

( * ) Notice: Subject to any disclaimer, the term of this patent is extended or adjusted under 35 U.S.C. 154(b) by 414 days.

(21) Appl. No.: 11/141,848

(22) Filed: May 31, 2005

(65) Prior Publication Data
US 2005/0286520 A1    Dec. 29, 2005

Related U.S. Application Data

(60) Provisional application No. 60/576,158, filed on Jun. 1, 2004.

(51) Int. Cl.
*H04N 7/173* (2006.01)
(52) U.S. Cl. .......................................... 370/486; 725/87
(58) Field of Classification Search ............. 725/25–31, 725/86–104
See application file for complete search history.

(56) References Cited

U.S. PATENT DOCUMENTS

| 7,296,074 | B2 * | 11/2007 | Jagels ........................ 709/227 |
| 2002/0162114 | A1 * | 10/2002 | Bisher et al. ................... 725/91 |
| 2004/0181800 | A1 * | 9/2004 | Rakib et al. ................... 725/25 |
| 2006/0218601 | A1 * | 9/2006 | Michel ........................ 725/87 |

* cited by examiner

*Primary Examiner*—Steven H Nguyen
*Assistant Examiner*—Alex Skripnikov
(74) *Attorney, Agent, or Firm*—Pearl Cohen Zedek Latzer, LLP (57) ABSTRACT

A method and system for providing video on demand, the method includes: (i) sending, by a resource manager, authorized media stream identification information to a modulation and radio frequency transmitter; (ii) receiving, by a radio frequency transmitter, at least one media stream encapsulated within addressable packets; wherein the at least one media stream is associated with corresponding received identification information; and (iii) determining, by the modulation and radio frequency transmitter, whether to modulate and transmit the received media stream in response to relationship between the authorized media stream identification information and between the receives identification information.

13 Claims, 8 Drawing Sheets

METHOD, TRANSMITTER AND SYSTEM FOR PROVIDING VIDEO ON DEMAND SERVICES

RELATED CASES

This patent claims priority from: U.S. provisional patent application Ser. No. 60/576,158 filed Jun. 1, 2004.

FIELD OF THE INVENTION

The present invention relates to communication systems and especially to methods and systems for providing video on demand services.

BACKGROUND OF THE INVENTION

Media streams are transmitted and stored over various networks and devices. In order to provide high resolution color images in an efficient manner the image must be dramatically compressed. Various methods for compressing and decoding media streams have emerged. A group of compression standards was developed by the Moving Picture Expert Group. These standards are known in the art as the MPEG family. Each MPEG standard defines a method for compressing and transmitting audio-visual information according to predefined timing schemes that allow displaying audio visual content embedded within media streams.

Raw video streams are provided to an MPEG encoder. A raw video stream is encoded by an MPEG encoder to provide a video elementary stream. Video and audio elementary streams may be multiplexed to provide a transport stream or a program stream. A single transport stream can include a single program or multiple programs. Each transport stream packet includes a header that includes multiple fields such as a program identifier (PID) field.

In addition to video streams, network providers allow end users to exchange data over the Hybrid Fiber Coax (HFC) network that is mainly used for downstream transmissions and an optional out-of-band network. DOCSIS is a well known standard for transmission of the data.

Transport streams (TS) can include a single program or a multiplex of different programs. The latter is known as Multiple Program Transport Stream (MPTS).

An TS also includes Program Specific Information (PSI) that describes the programs that form the MPTS and the elementary streams that belong to each program. The PSI is conveyed in packets that have a unique PID. The PSI includes, for example, a Program Association Table (PAT) and a Program Map Table (PMT). The PAT lists the programs that are included within the TS and the PMT lists the various elementary streams that form a program.

Transport streams are designed to convey media (video and/or audio) signals. Other communication protocols can convey multiple information types that differ from video. These communication protocols are not tailored to carry only video and can carry video as well as other types of information. Such communication protocols are referred to as Multiple Purpose Communication Protocols (MPCPs).

Usually, communication networks use a stack of communication protocols. The seven layer OSI model includes seven layers, while other commonly used protocol stacks include a different amount of layers.

MPCP protocols are usually the lower layer protocols of a protocol stack. They may include inter-network layer protocols, network interface layer protocols, and even transport layer communication protocols that differ from the MPEG transport stream.

Some commonly used MPCP protocols are ATM, IP, UDP, Ethernet, GigaEthernet, and the like.

Media applications are time sensitive and usually do not use the TCP protocol but rather the UDP protocol. The UDP protocol is less reliable than the TCP but is not associated with the delays that characterize the TCP protocol. Each program is sent to the edge QAM modulator with a unique UDP port.

One common protocol stack includes MPEG transport stream, UDP, IP and Ethernet. Accordingly, an MPCP thread that conveys such a TS includes TS packets that are encapsulated within IP packets, UDP packets, Ethernet frames, and the like.

Figure 1:
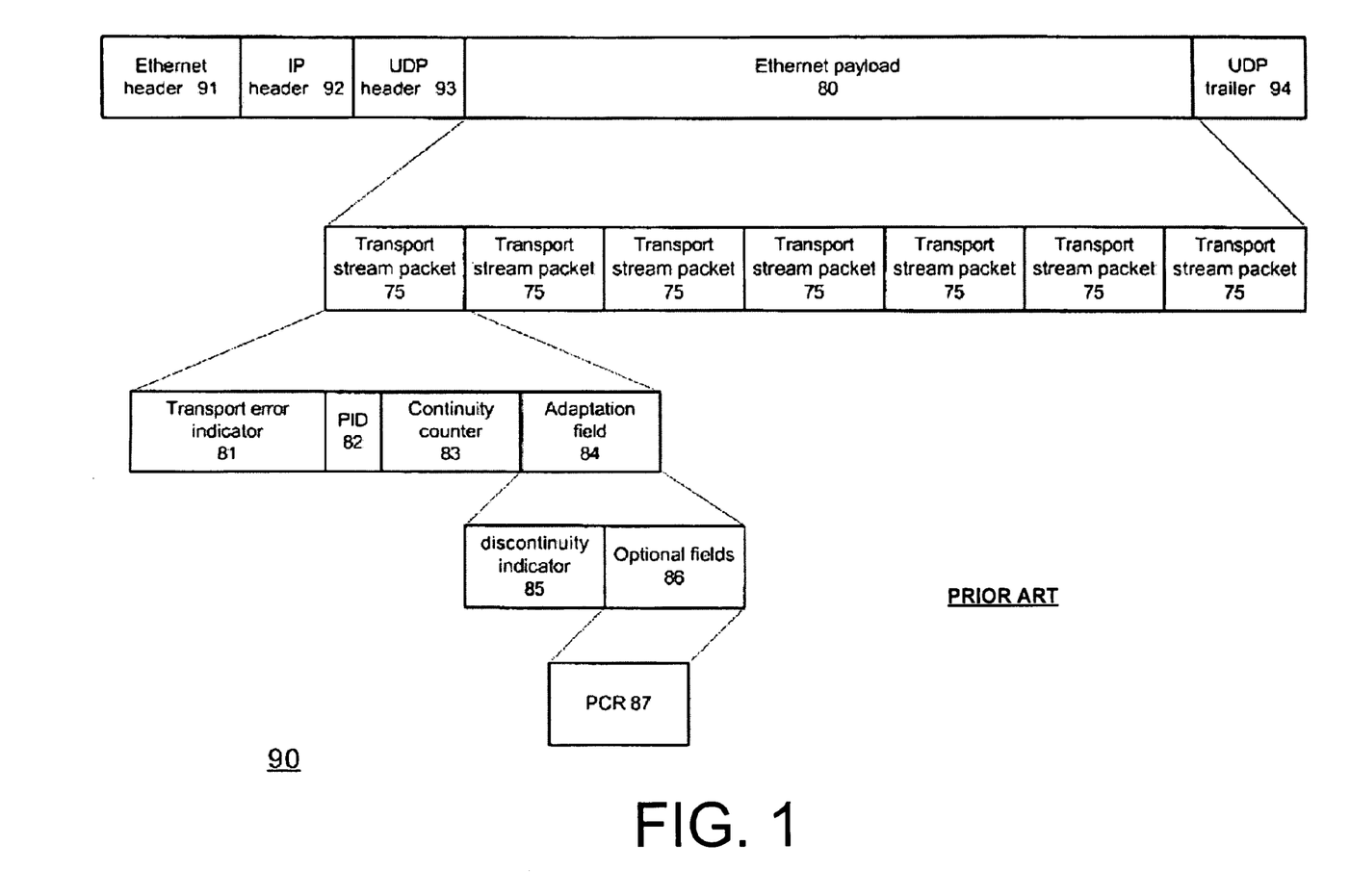
FIG. 1 illustrates a prior art Ethernet frame.

FIG. 1 illustrates a prior art Ethernet frame 90. Ethernet frame 90 includes an Ethernet header 91, an IP header 92, a UDP header 93, an Ethernet frame trailer 94 as well as multiple TS packets 75. An exemplary transport packet (of a TS) 75 includes transport stream payload (not shown) and a transport stream header. Various fields of the transport stream header are shown. Some are omitted for simplicity of explanation. The illustrated fields of the transport stream header include: a transport error indication bit 81, PID field 82, continuity counter field 83, discontinuity indicator field 85, and PCR field 87. The discontinuity indicator field 85 is a part of an adaptation field 84. The PCR field 87 is a part of optional fields 86.

Video On Demand systems include near video on demand, true video on demand and the like. Video on demand systems are capable of providing programs to viewers (also referred to as clients or end-users) over communication networks such as the HFC network. It is noted that networks other than HFC networks can be used.

Modern video on demand systems include multiple video on demand (VOD) servers that store multiple programs, resource managers and edge QAM modulators. The edge QAM modulators usually are adapted to: (i) receive Ethernet frames that encapsulate the transport packets, (ii) de-capsulate these frames and remove network jitter, and (iii) transmit radio frequency signals representative of the transport stream packets to end users, over the HFC network.

A white paper written by NetPredict of Menlo Park, Calif., titled "Probabilistic Approach to Provisioning of Resources for Delivery of Interactive TV", describes a forward path delivery system that allows MPEG-2 content from a headend or a remote source to be sent, over an IP network, to a remote edge QAM modulator. Edge QAM modulator performs various modulations and sends a Radio Frequency signal over a Hybrid Fiber Coax (HFC) network to 500 to 2000 end users.

A white paper written by Motorola™ titled "Next-Generation CMTS architecture: Protecting Network Investments While Migrating to Next-Generation CMTS Platforms", which is incorporated herein by reference, describes a decoupled CMTS that includes: (i) a forwarder, (ii) a MAC domain manager, (iii) Upstream Receiver PHY, (iv) Downstream Edge QAM modulators and (v) a Gigabit Ethernet Switch Matrix. The upstream receiver PHY received upstream information from multiple clients, encapsulates the upstream packets to Ethernet frames and sends control packets to the MAC domain manager while sending data packets to the forwarder. The Forwarder routes traffic between the HFC network and an IP regional network. The traffic can be upstream data, downstream data, and downstream video on demand. In the downstream direction the forwarder sends DOCSIS traffic from the regional IP networks and sends it to the appropriate edge QAM modulator. The MAC domain manager controls access to the upstream DOCSIS channel.

The edge QAM modulator receives data packets and transport stream packets (provided to the regional IP network from a VOD server) from the forwarder, performs some packet processing and timing corrections, multiplexes downstream data and VOD MPEG streams, implements modulation, performs frequency up-conversion and transmits a radio frequency signal over the HFC.

A typical edge QAM almost does not interact with other components of the VOD network. Typically it only receives configuration (usually frequency allocation) and status reports.

One main concern of a distributed VOD system is that for various reasons a VOD server may erroneously transmit to the edge QAM modulator a program that shouldn't be provided to the edge QAM modulator and hence to the clients. Such a program can be, for example, a program with adult content that is sent to under-aged clients, or a program that was erroneously sent to the client that was not subscribed to the video on demand services.

There is a need to enhance the control of programs that are sent by the edge QAM modulator.

SUMMARY OF THE PRESENT INVENTION

The invention provides a video on demand system, comprising: a resource manager, adapted to send authorized media stream identification information to a radio frequency transmitter; a video on demand server, adapted to provide a media stream encapsulated within multiple purpose communication protocol packets; and a radio frequency transmitter, connected to the video on demand server and to the resource manager, adapted to determine whether to transmit the received media stream in response to relationship between the authorized media stream identification information and between the media stream identification information.

The invention provides a method for providing video on demand, the method includes: sending, by a resource manager, authorized media stream identification information to a radio frequency transmitter; receiving, by the radio frequency transmitter, a media stream encapsulated within multiple purpose communication protocol packets; wherein the media stream is associated with corresponding media stream identification information; and determining, by the modulation and radio frequency transmitter, whether to modulate and transmit the received media stream in response to relationship between the authorized media stream identification information and between the media stream identification information.

A radio frequency transmitter, that includes: a controller, adapted to receive authorized media stream identification information from a resource manager; and a transmission path, connected to the controller, adapted to transmit radio frequency signals representative of a media stream, in response to a control signal provided by the controller; wherein the controller is adapted to determine whether to transmit radio frequency signals representative of the received media stream in response to a relationship between an authorized media stream identification information and between a media stream identification information.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The disclosed technique is directed to a broadband network, which can be either wired or wireless, such as an HFC network, a DSL network, satellite communication and the like.

It is further noted that the description relates to MPEG (and especially MPEG2) compliant programs and components, but the invention is applicable to other types of media unit decoding and/or compression schemes as well.

The detailed description relates to a QAM modulator (also referred to as edge QAM or simply QAM). It is noted that it is applicable to other various radio frequency transmitters, such as but not limited to transmitters that include various modulators, and use modulation schemes that differ from QAM. It is further noted that a QAM modulator can include both a modulator and a radio frequency transmission path but they can be located in separate units, without departing from the scope of the invention.

Figure 2:
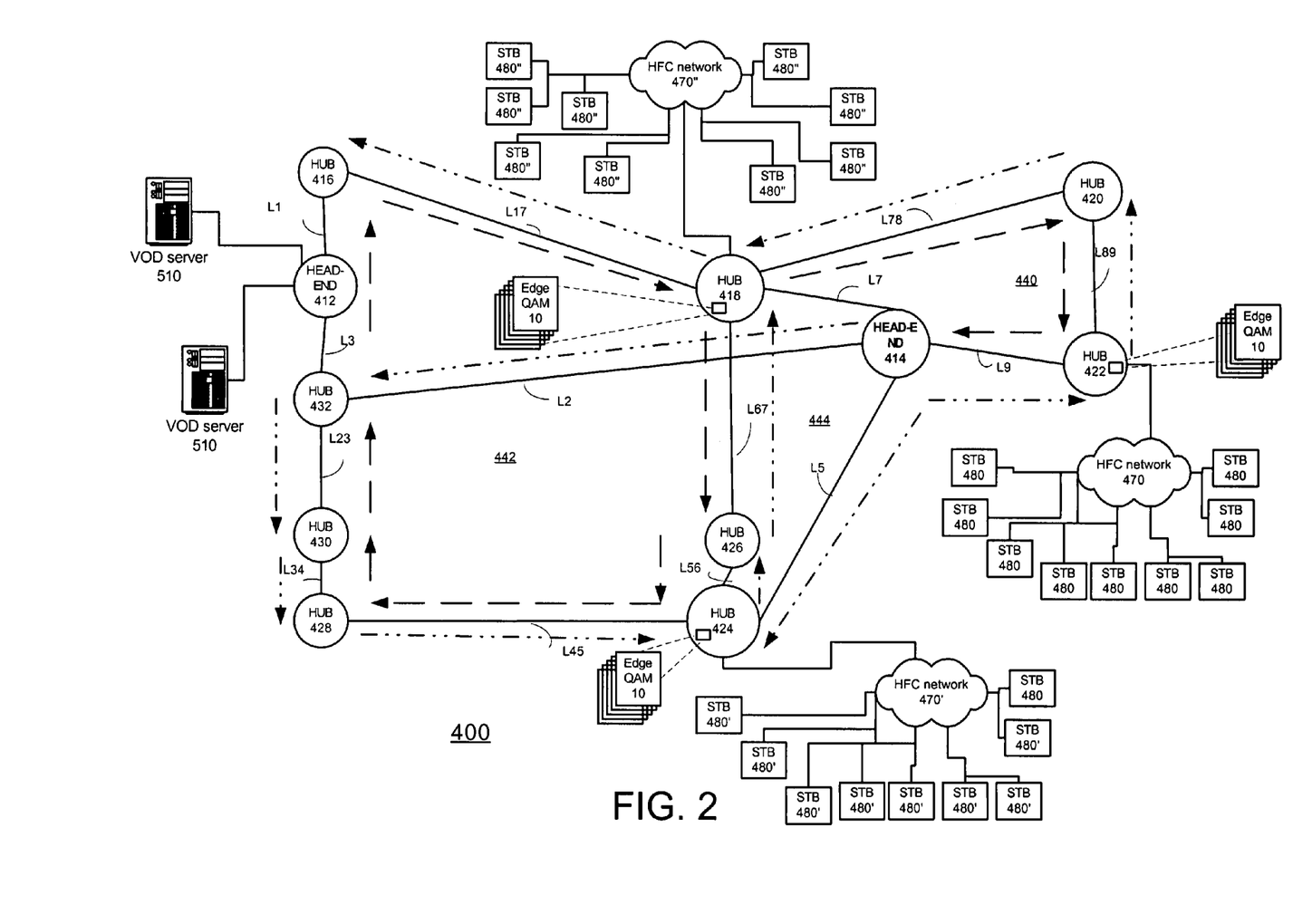
FIG. 2 illustrates a network according to an embodiment of the invention.

FIG. 2 illustrates a network 400 according to an embodiment of the invention. Network 400 interconnects two media stream sources such as headends 412 and 414 to multiple intermediate entities such as hubs 416-432. Conveniently some or even all of hubs 416-432 are connected to multiple users, typically via local cable access networks. For simplicity of explanation only the connection of certain hubs (418, 422 and 424) to HFC networks and to end user equipment is illustrated.

Typically, a single QAM modulator can output a multiplex of ten or twelve programs, although this is not necessarily so. The amount of programs is usually dictated by a communication standard. An MPTS can include more than ten or twelve programs. Accordingly, a typical hub includes multiple edge QAM modulators.

Each hub (416, 418, 420, 422, 424, 426, 428, 430 and 432) can include an array of radio frequency transmitters such as edge QAM modulators 10. These QAUM modulators include a transmission path as well as various modulators. For simplicity of explanation only hubs 418, 422 and 424 are illustrated as having an array of edge QAM modulators 10.

Each headend can be connected to one or more video on demand servers as well as to other media sources.

First headend 412 is connected to hub 416 via link L1. Hub 416 is connected, via link L17, to hub 418. Hub 418 is connected, via link L7, to second headend 414 and, via links L78 and L67, to hubs 420 and 426. Hub 422 is connected, via link 89 to hub 420 and, via link L9, to second headend 414. Hub 424 is connected, via link L56, to hub 426 and via link L5 to second headend 414. Hub 428 is connected, via links L45 and L34, to hubs 424 and 430. Hub 432 is connected, via link L23, to hub 430, via link L3 to first headend 412 and via link L2 to second headend 414. Some of these hubs are conveniently primary hubs while others are secondary hubs.

Hubs 418, 420 and 422 and second headend 414 are connected such as to form a first ring 440. Hubs 416, 418, 424, 426, 428, 430 and 432 and first headends 412 are connected to form a second ring 442. Hubs 418, 424 and 426 and second headend 414 are connected such as to form a third ring 444.

First headend 412 provides a first Multiple Purpose Communication Protocol (MPCP) thread that propagates at a clockwise direction over rings 442 and 444. Second headend 414 provides a duplicate MPCP thread that propagates at a counter-clockwise direction over rings 440 and 444.

Hub 422 is connected to multiple end-users (also referred to as end-user equipment or premises equipment), such as but not limited set top boxes STB 480 via Hybrid Fiber Coax network 470. Hub 424 is connected to multiple end-users equipment, such as but not limited set top boxes STB 480' via network 470'. Hub 418 is connected to multiple end-users equipment, such as but not limited set top boxes STB 480" via network 470".

According to a first embodiment of the invention a resource manager is located within each one of headends 412 and 414. According to another embodiment of the invention at least one resource manager can be located within one or more hub. A resource manages is a component (hardware, software, middleware or a combination thereof) that determines resources (including component, frequency, bandwidth, port and the like) that are allocated for a certain task (such as a transmission of a video on demand program). The resource manager can be connected to various components such as billing components, load balancers, and the like.

According to an embodiment of the invention the video on demand servers are located within headends 412 and/or 414. This is not necessarily so as one or more video on demand server can be located elsewhere.

Each hub can receive one or more MPCP threads and provide to the HFC network connected to the hub one or more MPTSs. At least some of the programs within one or more MPTSs are video on demand programs that were requested by one or more end-user.

Referring back to hubs 418, 422 and 424—they can strip the MPCP information to provide MPTS packets to the STB 480, 480', or 480". This is not necessarily so and de-capsulation process can be performed within the end user equipment itself.

Figure 3:
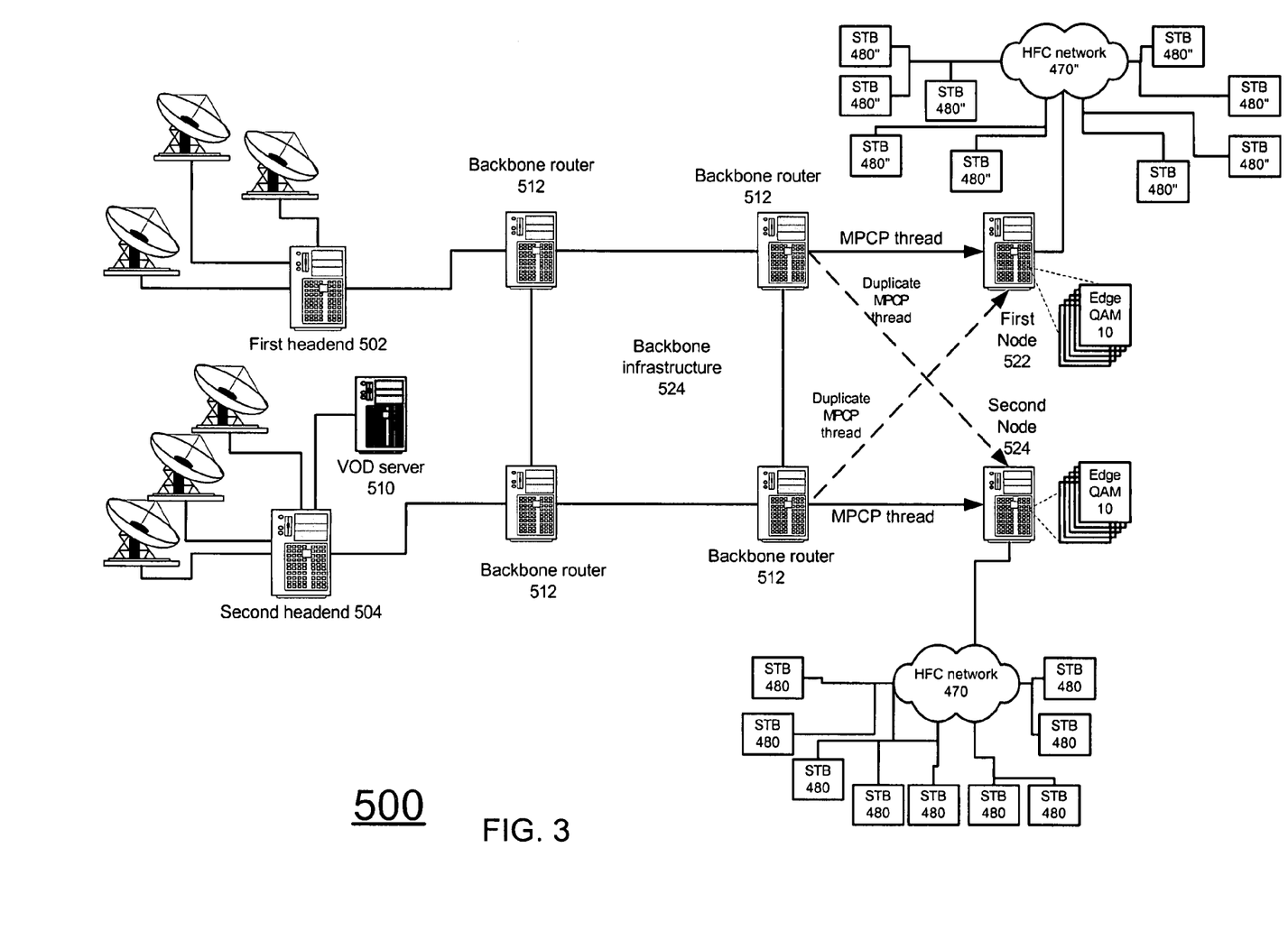
FIG. 3 illustrates network according to an embodiment of the invention.

FIG. 3 illustrates network 500 according to an embodiment of the invention.

Network 500 includes first and second headends 502 and 504, a backbone infrastructure 524 that includes backbone routers 512, a first node 522, a second node 524, two HFS networks 470 and 470" and multiple end-users equipment such as STB 480" and STB 480.

The first and second headends 502 and 504 receive media streams from satellite dishes and from video on demand servers (such as video on demand server 510) can perform various video processing operations, as well as providing MPCP threads that include multiple media streams. The MPCP threads are conveyed over the backbone infrastructure 524.

The first and second nodes 522 and 524 receive MPCP threads from the backbone infrastructure 524. The first node 522 and the second node 524 conveniently include an array of edge QAM modulators 10.

According to a first embodiment of the invention a resource manager is located within a first headend 502 and/or a second headend 504. According to another embodiment of the invention at least one resource manager can be located within the backbone infrastructure 524 and/or within the first or second hub 522 and 524.

According to an embodiment of the invention the video on demand servers are located within headends 502 and/or 504. This is not necessarily so as one or more video on demand server can be located elsewhere.

Figure 4:
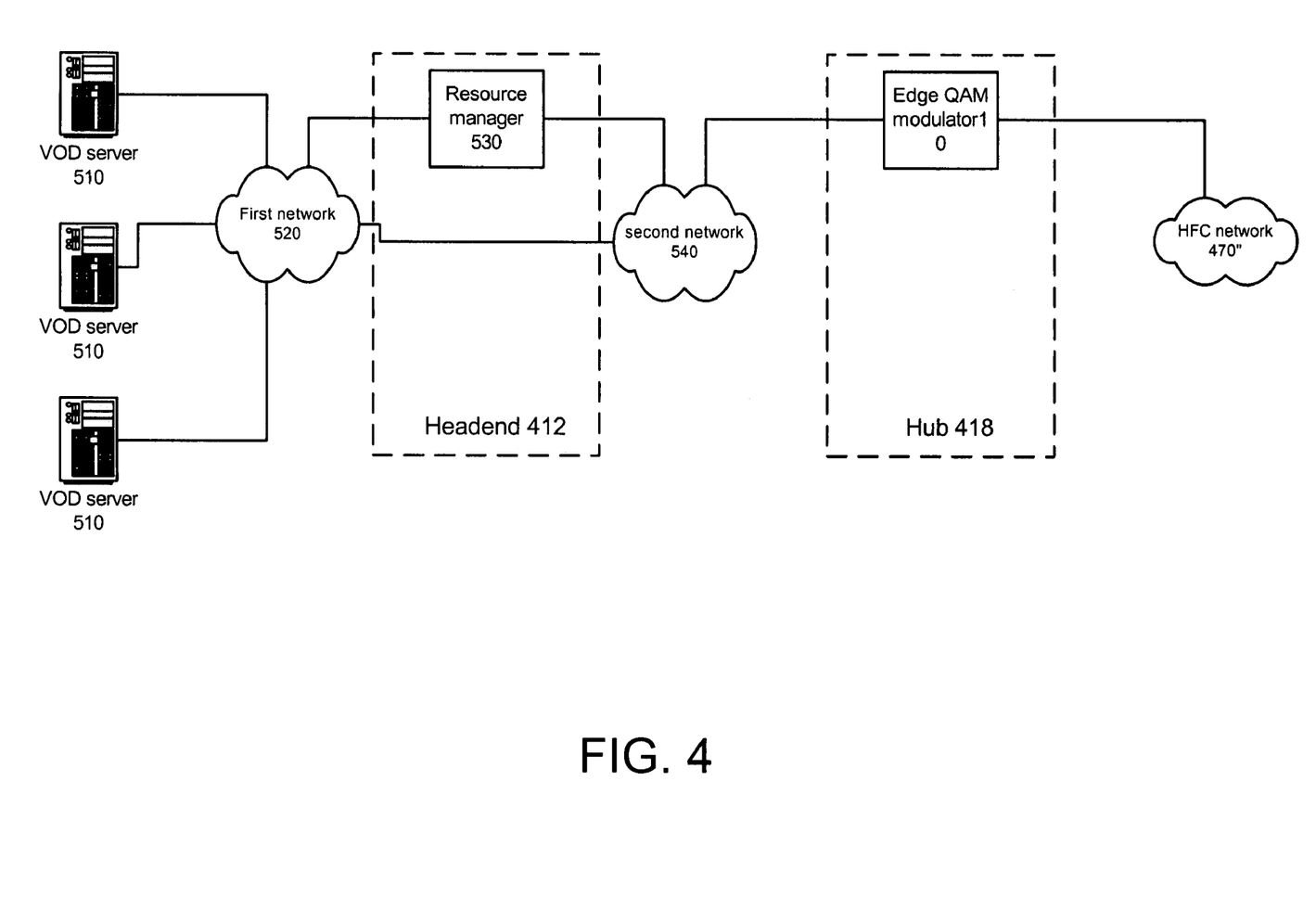
FIG. 4 illustrates multiple video on demand servers, a resource manager, and an edge QAM modulator array, according to an embodiment of the invention.

FIG. 4 illustrates multiple video on demand servers 510, a resource manager 530, and an edge QAM modulator array 10, according to an embodiment of the invention.

FIG. 4 illustrates multiple video on demand servers 510 that are connected to a resource manager 530 via a first network 520. This connection is mainly used for exchanging control information between the video on demand servers 510 and the resource manager 530.

The video on demand servers 510 are also connected to headend 412 via first network 520. This connection is mainly used for providing media streams (encapsulated within MPCP threads) from the video on demand servers, via the headend 412 to a second network 540.

The second network 540 is connected to hub 418 and to the headend 412.

The second network 540 can convey authorized media stream identification information (AMSID) from the resource manager 530 to one or more edge QAM modulators 10 located within hub 418.

The edge QAM modulators 10 receive media streams from the video on demand servers 510 (via networks 520 and 540) and also receive corresponding media stream identification information. Each QAM modulator can compare the AMSID received from the resource manager to the media stream identification information received from the video on demand servers 510 to determine whether to transmit the media streams to HFC network 470" or not.

Figure 5:
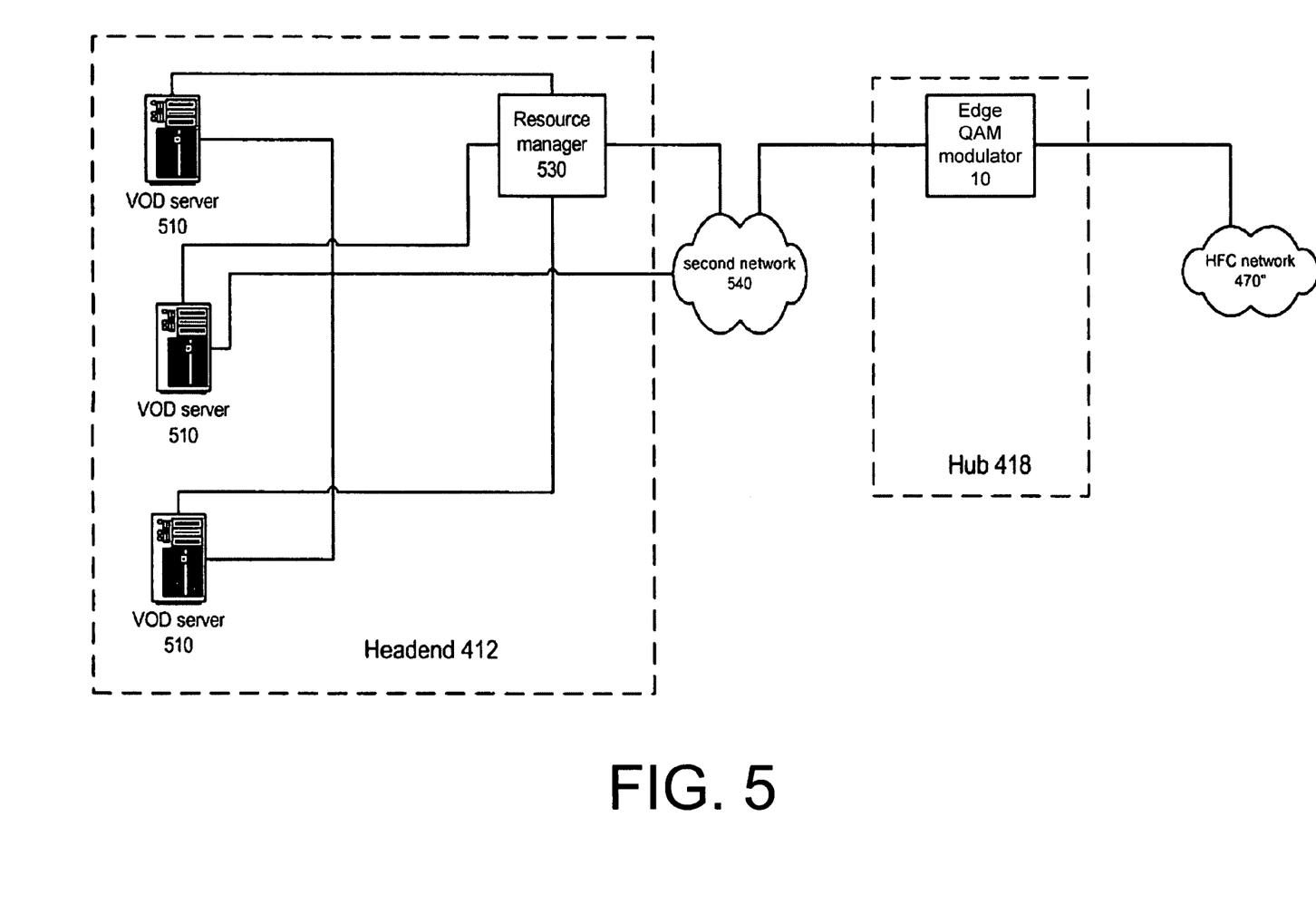
FIG. 5 illustrates multiple video on demand servers, a resource manager, and an edge QAM modulator array, according to another embodiment of the invention.

FIG. 5 illustrates multiple video on demand servers 510, a resource manager 530, and an edge QAM modulator array 10, according to another embodiment of the invention. FIG. 5 illustrates a headend 412 that includes both video on demand servers and the resource manager 530.

Figure 6:
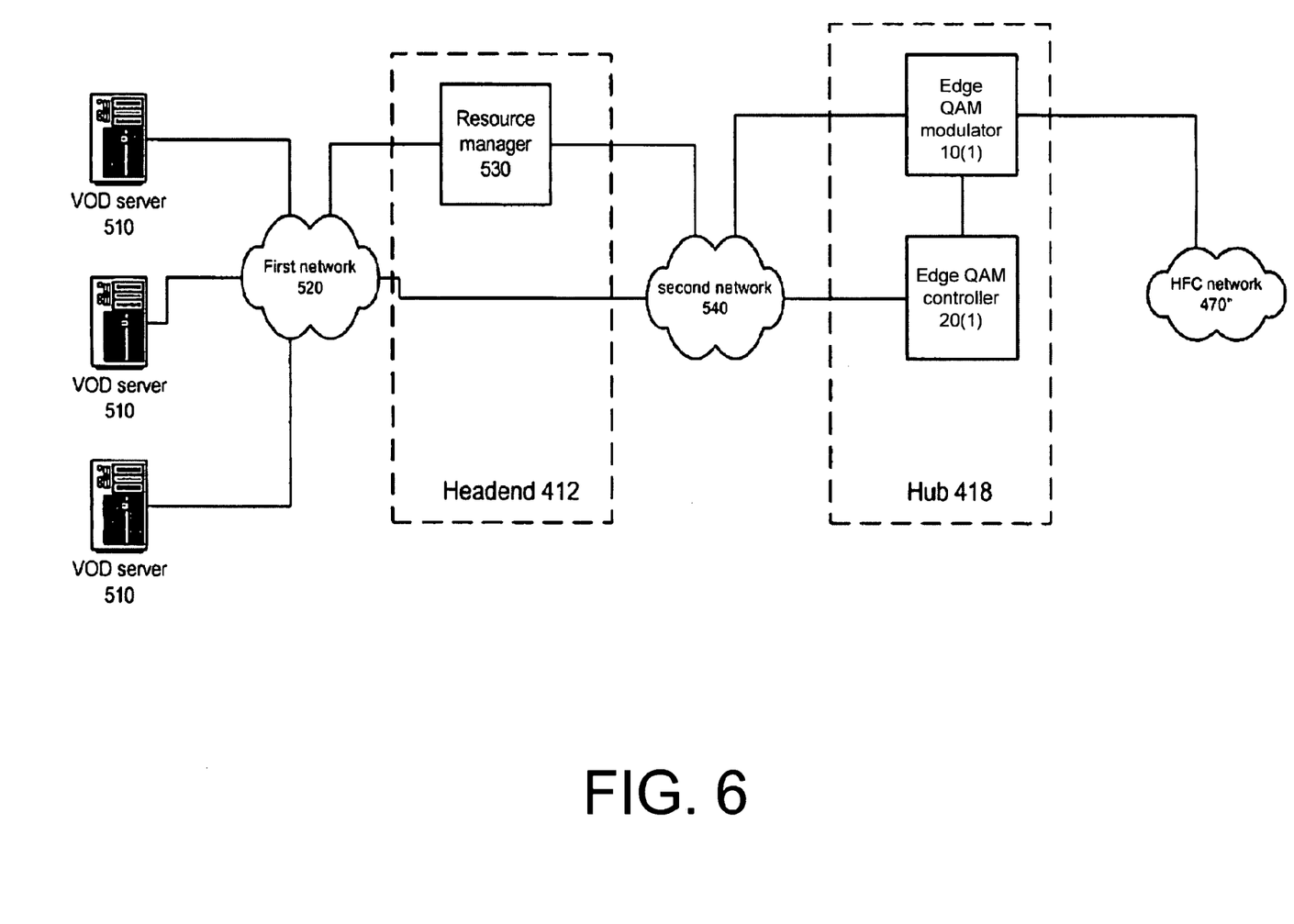
FIG. 6 illustrates multiple video on demand servers, a resource manager, and an edge QAM modulator array, according to a further embodiment of the invention.

FIG. 6 illustrates multiple video on demand servers 510, a resource manager 530, and an edge QAM modulator array 10(1), according to a further embodiment of the invention. In this application the controller of the QAM modulator (referred to as QAM controller 20(1)) is separated from other components of the QAM modulator, such as a transmission path.

The array of edge QAM modulators 10 are connected to one or more edge QAM controller 20(1) that receives the AMSID from the resource manager as well as receives the media stream identification information provided by the video on demand servers 510. In FIG. 4 the determination was done by controllers embedded within the edge QAM modulators themselves.

Figure 7:
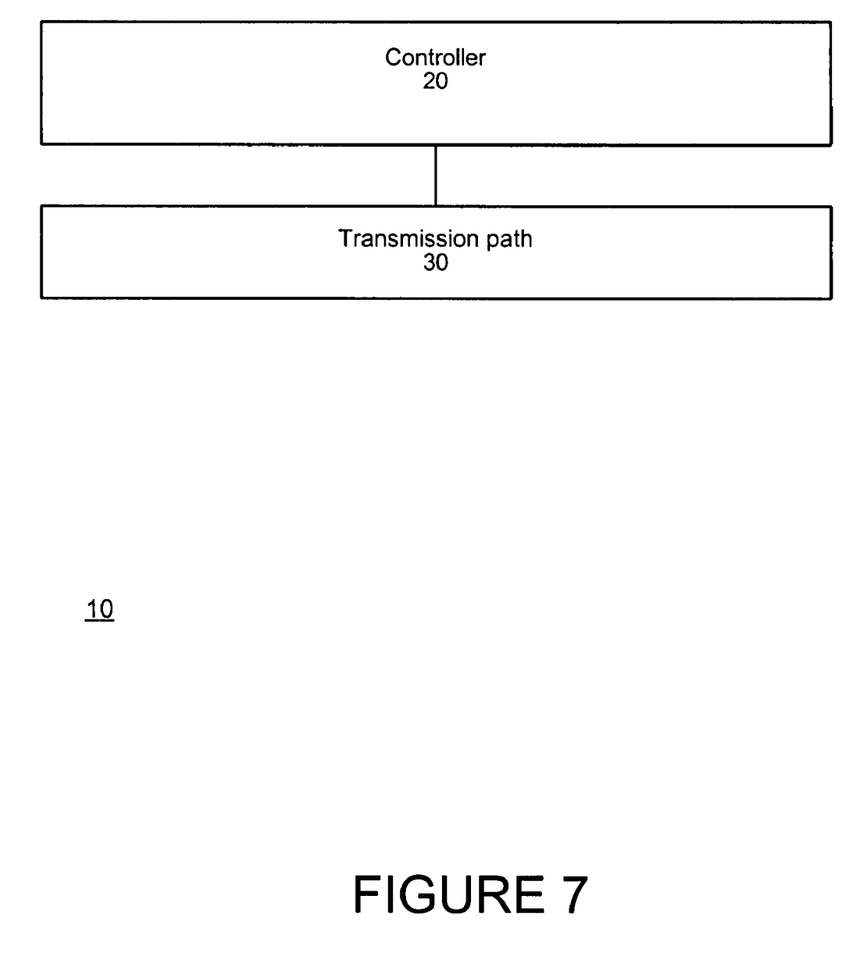
FIG. 7 illustrates a radio frequency transmitter, according to an embodiment of the invention.

FIG. 7 illustrates a radio frequency transmitter 10, according to an embodiment of the invention.

The radio frequency transmitter 10 includes: (i) a controller 20, adapted to receive authorized media stream identification information from a resource manager, and a transmission path 30, connected to the controller, adapted to transmit radio frequency signals representative of a media stream, in response to a control signal provided by the controller 20. The transmission path can include modulators, up-conversion circuitry, and a radio frequency amplifier, but this is not necessarily so.

The controller 20 is adapted to determine whether to transmit radio frequency signals representative of the received media stream in response to a relationship between an authorized media stream identification information and between a media stream identification information.

Figure 8:
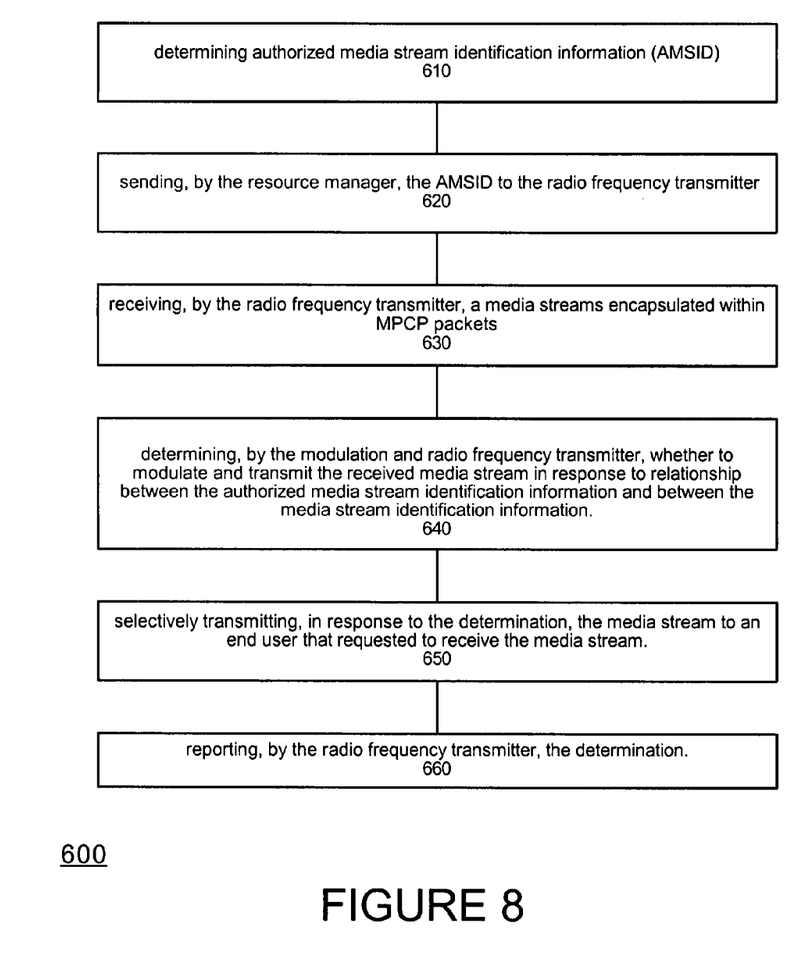
FIG. 8 illustrates a method for providing video on demand, according to an embodiment of the invention.

FIG. 8 illustrates a method 600 for providing video on demand, according to an embodiment of the invention.

Method 600 starts by stage 610 of determining authorized media stream identification information (AMSID). The determination can be performed by a resource manager, but this is not necessarily so. For example, the determination can be made by other components, or can be done more than a single component. The resource manager can co-operate with the radio frequency transmitter in order to determine the AMSID. According to another embodiment of the invention the resource manager can use the AMSID only after the radio frequency transmitter acknowledged the reception of the AMSID.

Stage 610 is followed by stage 620 of sending, by the resource manager, the AMSID to the radio frequency transmitter. The radio frequency transmitter can be a QAM modulator.

Conveniently, stage 620 includes acknowledging a reception of the authorized media stream identification information by the radio frequency transmitter.

Stage 620 is followed by stage 630 of receiving, by the radio frequency transmitter, a media stream encapsulated within MPCP packets. Conveniently, the media stream is associated with a corresponding media stream identification information.

Stage 630 is followed by stage 640 of determining, by the modulation and radio frequency transmitter, whether to modulate and transmit the received media stream in response to relationship between the authorized media stream identification information and between the media stream identification information. Conveniently, the modulation and radio frequency transmitter compares the AMSID and the media stream identification information of that stream. If they are equal the media stream is transmitted towards the client. Else, the radio frequency transmitter can decide not to transmit the media stream.

According to yet another embodiment of the invention the radio frequency transmitter can notify the resource manager about the difference between the AMSID and the received media stream identification information in order to receive instructions relating to the transmission of the received media stream. This notification facilitates a transmission of a media stream if, for example, the AMSID or the media stream identification information were corrupted.

Conveniently, the authorized media stream identification information is sent to the radio frequency transmitter while using a first communication protocol. The addressable packets are transmitted using a second communication protocol that differs from the first communication protocol.

Conveniently, the method can include sending multiple media streams and their corresponding media stream identification information as well as multiple AMSIDs to the radio frequency transmitter.

According to an embodiment of the invention the authorized media stream identification information includes video layer information. The video layer information can be included, for example, within the transport stream header. It can be associated with a unique PID, that can be agreed in advance and/or included within the PSI.

According to another embodiment of the invention the authorized media stream identification information includes communication layer information. For example, it can be included within a UDP header, a IP header, a Ethernet header and the like.

Stage 640 is followed by stage 650 of selectively transmitting, in response to the determination, the media stream to an end user that requested to receive the media stream. The media stream is not transmitted if the radio frequency transmitter decides not to transmit the media stream.

Stage 650 is followed by stage 660 of reporting, by the radio frequency transmitter, the determination. The resource manager and/or the video on demand server can be notified. The video on demand can stop providing that media stream.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method for providing a video on demand media stream, the method comprising:
    sending, by a resource manager, authorized media stream identification information to a radio frequency transmitter;
    receiving, by the radio frequency transmitter, a media stream encapsulated within multiple purpose communication protocol packets; wherein the media stream is associated with a media stream identification information;
    determining, by the radio frequency transmitter, whether to modulate and transmit the received media stream in response to a relationship between the authorized media stream identification information and between the media stream identification information;
    reporting the determination to a server from which the encapsulated media stream is received, by the radio frequency transmitter; and
    selectively ceasing, by the server, a transmission of the media stream, in response to the determination reported;
    wherein the method further comprises decapsulating the multiple purpose communication protocol packets, to provide a multiple program transport stream.

2. The method according to claim 1 comprising utilizing a first protocol for sending the authorized media stream identification information and utilizing a second protocol for sending the media stream.

3. The method according to claim 1 wherein the authorized media stream identification information comprises video layer information.

4. The method according to claim 1 wherein the authorized media stream identification information comprises multiple purpose communication protocol information.

5. The method according to claim 1 further comprising acknowledging a reception of the authorized media stream identification information by the radio frequency transmitter.

6. The method of claim 5, wherein a utilization of the authorized media stream identification by the resource manager is conditioned by a reception by the resource manager of an acknowledgment of the information by the radio frequency transmitter.

7. The method according to claim 1 further comprising selectively transmitting, in response to the determination, the media stream to an end user that requested to receive the media stream.

8. The method according to claim 1 wherein the authorized media stream identification information is a session identifier.

9. The method according to claim 1 further comprising generating the multiple purpose communication protocol packets by a video on demand server.

10. The method of claim 1, wherein the sending is preceded by determining, by a co-operation of the resource manager and the radio frequency transmitter, the authorized media stream identification information.

11. The method of claim 1, further comprising notifying the resource manager, by the radio frequency transmitter, of a differences between the authorized media stream identification information and the media stream identification information; and receiving from the resource manager, by the radio frequency transmitter, instructions relating to the transmission of the media stream.

12. The method of claim 1, wherein the sending comprises sending authorized media stream identification information that is comprised in communication layer information selected from a user datagram protocol (UDP) header, an internet protocol (IP) header, and an Ethernet header.

13. The method of claim 1, wherein the receiving comprises receiving the media stream encapsulated within multiple purpose communication protocol packets that correspond to a multiple purpose communication protocol which is selected from a group of protocols that consists of the following protocols: asynchronous transfer mode (ATM); internet protocol (IP); user datagram protocol (UDP); Ethernet, and GigaEthernet.

\* \* \* \* \*